United States Patent
Nation

(10) Patent No.: US 7,136,425 B2
(45) Date of Patent: Nov. 14, 2006

(54) COMBINING FREQUENCY MULTIPLICATION AND MODULATION

(75) Inventor: Med A. Nation, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 09/871,294

(22) Filed: May 31, 2001

(65) Prior Publication Data

US 2002/0181605 A1  Dec. 5, 2002

(51) Int. Cl.
*H04L 27/04* (2006.01)
*H04L 27/36* (2006.01)

(52) U.S. Cl. .................................. 375/295

(58) Field of Classification Search ............. 375/295, 375/298, 302, 271, 279; 455/114, 119; 359/328, 359/329
See application file for complete search history.

(56) References Cited

U.S. PATENT DOCUMENTS 5,473,280 A * 12/1995 Ohnishi et al. ............ 329/304
5,844,449 A * 12/1998 Abeno et al. ............... 332/105
5,914,620 A    6/1999 Simons et al.
6,091,941 A    7/2000 Moriyama et al.
6,240,142 B1   5/2001 Kaufman et al.
6,542,722 B1 * 4/2003 Sorrells et al. ............ 455/110
6,587,257 B1 * 7/2003 Davies ...................... 359/328

FOREIGN PATENT DOCUMENTS

WO    WO 01/08319 A1   2/2001

* cited by examiner

Primary Examiner—Kevin Kim
(74) Attorney, Agent, or Firm—Trop, Pruner & Hu, P.C.

(57) ABSTRACT

A technique includes generating a first signal that has a fundamental frequency and modulating an input signal with the first signal. The modulation is tuned to a harmonic of the fundamental frequency to produce a modulated signal that has a carrier frequency near the harmonic.

15 Claims, 3 Drawing Sheets

COMBINING FREQUENCY MULTIPLICATION AND MODULATION

BACKGROUND

The invention generally relates to combining frequency multiplication and modulation (linear modulation, for example).

The generation of high frequency carrier signals (microwave carrier signals, for example) for use in communication systems (wireless communication systems, for example) presents challenges. For example, the implementations of microwave voltage controlled oscillators (VCOs) in integrated circuits makes its increasingly difficult to make these VCOs stable and able to produce clean carrier signals, especially in view of the trend to make these VCOs operate at ever-increasing frequencies. Furthermore, it is more difficult to design the phase locked loops of these VCOs for such high frequencies.

For these reasons, a modulation system 10 that is depicted in FIG. 1 may be used. In the system 10, a local oscillator 12 (a VCO, for example) generates a signal (a sinusoidal signal, for example) that has a fundamental frequency that is a fraction (one third, for example) of the frequency of the carrier signal. This signal from the oscillator 12 is received by a frequency multiplier 14 that multiplies (multiplies by three, for example) the frequency of this signal to produce the carrier signal, a signal that has a fundamental frequency that is three times the fundamental frequency of the signal from the oscillator 12. This carrier signal may be used by a modulator 16 to modulate an input signal at the carrier frequency to produce a modulated signal. Thus, the design of the oscillator 12 is simplified due to its lower frequency of operation, as compared to an oscillator that directly generates the carrier signal.

However, a difficulty with the modulation system 10 is that the frequency multiplier 14 may introduce a significant amount of spectral energy into the carrier signal at frequencies other than the carrier frequency. This distortion of the carrier signal may, in turn, expand or distort the modulated signal. Although it may be possible to pre-distort the original modulation to compensate for the distortion that is introduced by the frequency multiplier 14, this pre-distortion may not always be desirable for various reasons.

Thus, there is a continuing need for a technique and/or arrangement to address one or more of the problems that are stated above.

DETAILED DESCRIPTION

Figure 1:
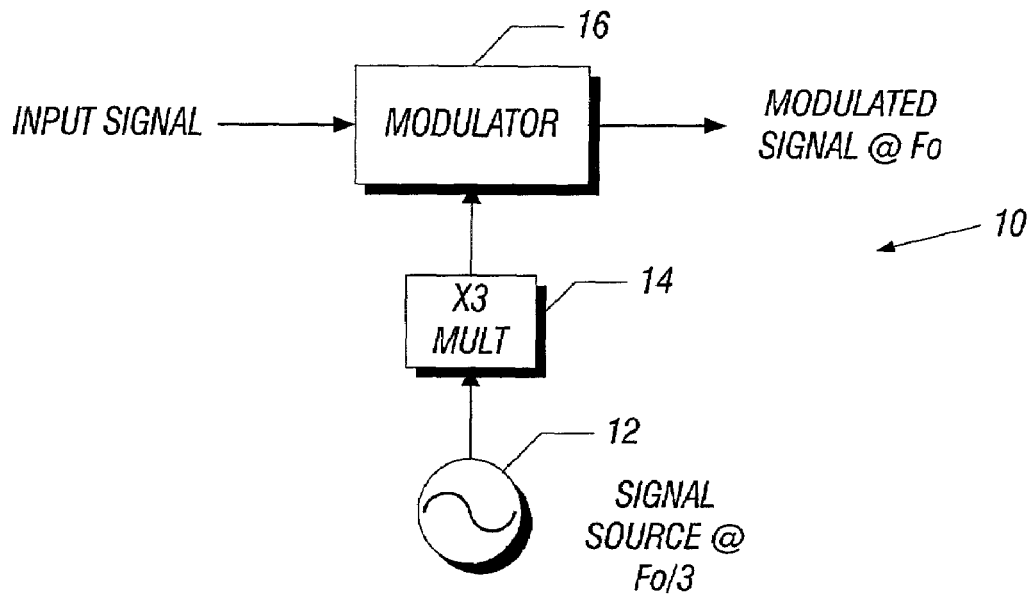
FIG. 1 is a schematic diagram of a modulation system of the prior art.
Figure 2:
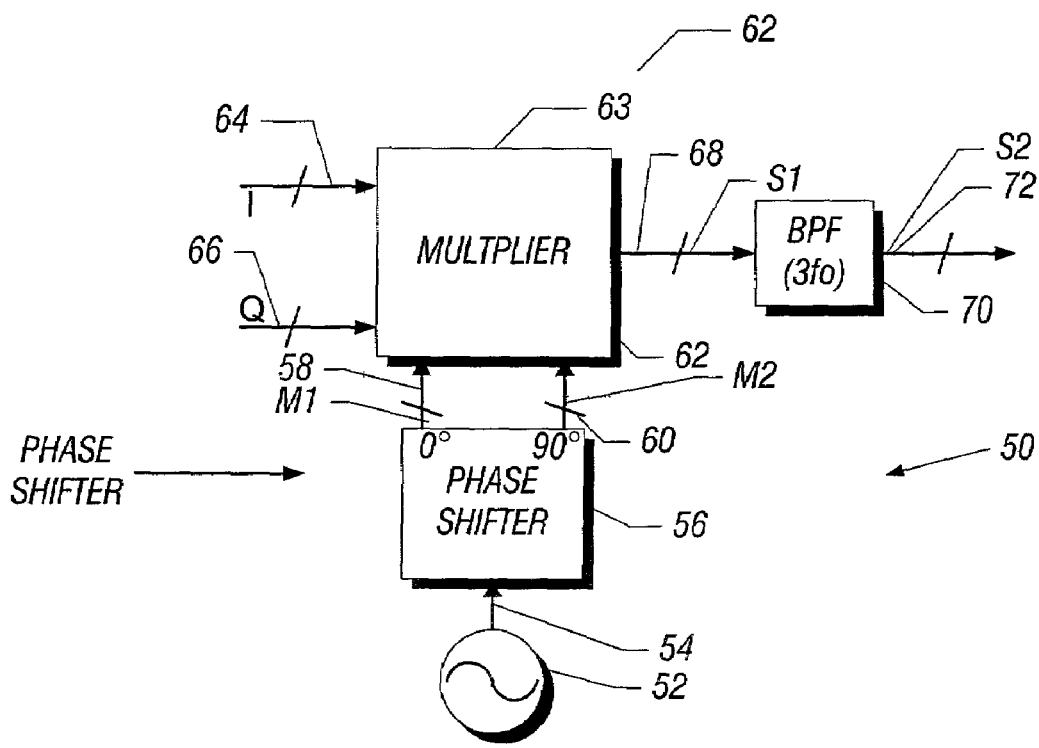
FIG. 2 is a schematic diagram of a modulation system according to an embodiment of the invention.

Referring to FIG. 2, an embodiment 50 of a modulation system in accordance with the invention includes an modulator 62 that modulates a complex input signal to produce a modulated signal (called S2) at output terminals 72 of the system 50. The modulator 62 may, for example, be a linear modulator that linearly modulates the amplitude of the input signal pursuant to a Quadrature Amplitude Modulation (QAM) technique (for example).

The S2 signal indicates the modulation of the input signal at a carrier frequency. However, unlike a conventional modulation system, the modulator 62 does not modulate the input signal with a signal that cycles at the carrier frequency. Instead, the modulator 62 includes a multiplier 63 (described in more detail below) to modulate the input signal with phase shifted carrier signals (called M1 and M2) that each have a fundamental frequency that is a fraction of the carrier frequency of the S2 signal. The M1 and M2 signals are produced by a local oscillator 52 that operates at the fundamental frequency of the M1, M2 signal. In some embodiments of the invention, the modulation by the multiplier 63 produces a modulated signal (called S1 and appearing at the output terminals 68 of the multiplier 63) that has a carrier frequency that is near the fundamental frequency of the M1, M2 signal.

Thus, the carrier frequency of the S1 signal (and the frequency of operation of the oscillator 52) is a fraction of the carrier frequency of the S2 signal. However, the oscillator 52 is permitted to operate at this lower frequency due to the frequency multiplication that occurs when the multiplier 63 modulates the input signal with the M1 and M2 signals. In this manner, the modulation by the multiplier 63 produces spectral components (in the S1 signal) that are located at, for example, odd multiples (three times, five times, seven times, etc.) of the fundamental frequency of the M1, M2 signal. These higher frequencies that are multiples of the fundamental frequency of the M1, M2 signal are called harmonics, and the spectral energy near each one of these harmonics indicates the modulation of the input signal at the particular harmonic.

Therefore, for purposes of producing the S2 signal, the modulation system 50 includes a bandpass filter (BPF) 70 that is coupled to the multiplier 63 to tune the modulation to the selected harmonic to produce the desired carrier frequency of the S2 signal. To accomplish this, the BPF 70 has a passband that is centered near a selected one of the harmonics, and the BPF 70 has appropriate rolloff characteristics to create a stopband to reject spectral components (of the S1 signal) that are located at the carrier frequency of the S1 signal and to reject other harmonics present in the S1 signal. This filtering produces the S2 signal that includes substantially more spectral energy near the selected harmonic than near the fundamental frequency of the M1, M2 signal. Thus, the S2 signal indicates the modulation of the input signal at the carrier frequency, although this carrier frequency is significantly higher than the frequency of operation of the oscillator 52.

Due to the combined modulation and frequency multiplication of the modulator 62, the oscillator 52 does not operate at the carrier frequency of the S2 signal, thereby simplifying the design of the oscillator 52. Furthermore, no explicit frequency multiplier is used.

As depicted in FIG. 2, the S1 and S2 signals are separate signals in some embodiments of the invention. However, as described in another embodiment below, the BPF 70 is coupled to the multiplier 63 to tune the modulation so that the multiplier 63 furnishes the S2 signal at its output terminals. Thus, in these embodiments, the S2 signal is directly provided by the multiplier 63 without generation of the S1 signal.

As a more specific example, in some embodiments of the invention, the M1 and M2 signals may be sinusoidal signals, and the fundamental frequency of the M1, M2 signal may be one third of the carrier frequency of the S2 signal. The BPF 70 may have a passband that passes the spectral energy of the S1 signal that is associated with the third harmonic of the S1 signal to produce the S2 signal, a signal that has a carrier frequency that is three times that of the fundamental frequency of the M1, M2 signal. Thus, the filtering by the BPF 70 in this example produces an S2 signal that includes substantially more spectral energy near the third harmonic of the fundamental frequency of the M1, M2 signal than near the fundamental frequency or near other harmonics.

The M1 and M2 signals may be provided by a 90° phase shifter 56 that receives a sinusoidal (for example) signal from an output terminal 54 of the oscillator 52. The phase shifter 56 passes through the sinusoidal signal from the oscillator 52 to produce the M1 signal at an output terminal 58 of the phase shifter 56. The phase shifter 56 also shifts the sinusoidal signal received from the oscillator 52 by 90° to produce the M2 signal. Thus, the M1 and M2 signals have the same fundamental frequency but are shifted apart by 90°. In some embodiments of the invention, the oscillator 52 may be a voltage controlled oscillator (VCO).

The input signal is a complex signal that is formed from a real component that is indicated by an analog signal (called Q) and an imaginary component that is indicated by an analog signal (called I). The I and Q signals are differentially received by input terminals 64 and 66, respectively, of the modulator 62.

Figure 3:
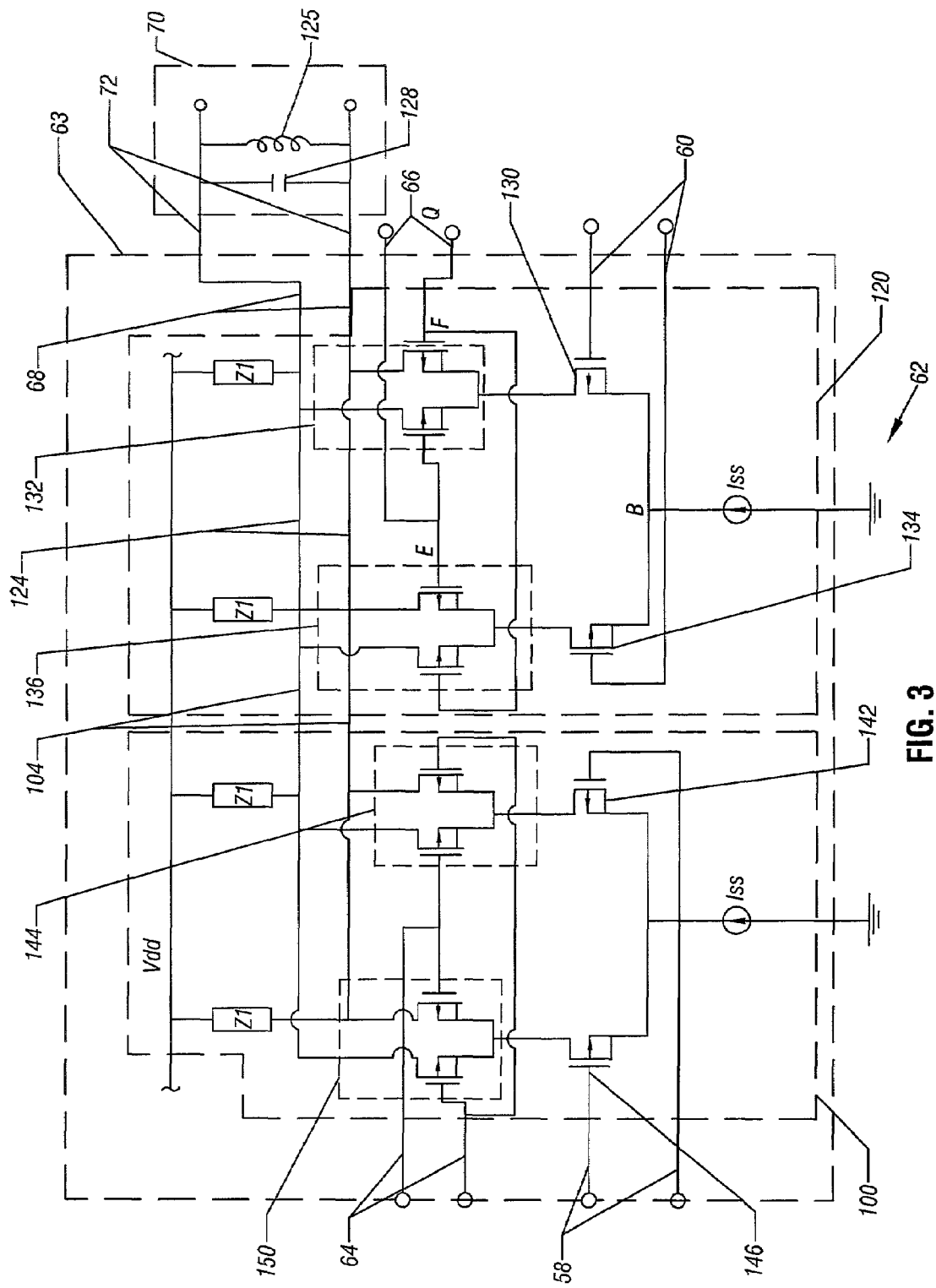
FIG. 3 is a schematic diagram of a modulator of FIG. 2 according to an embodiment of the invention.

Referring to FIG. 3, in some embodiments of the invention, the multiplier 63 may be formed from two Gilbert cell multipliers 100 and 120. The Gilbert cell multiplier 100 multiplies the I signal with the M1 signal, and the Gilbert cell multiplier 120 multiplies the Q signal with the M2 signal. The multipliers 100 and 120 are coupled together to produce, in conjunction with the tuning that is provided by the BPF 70, the S2 signal that appears at the output terminals 72. For the embodiment that is depicted in FIG. 3, the output terminals 68 of the modulator 62 are also the output terminals 72 of the BPF 70.

In the Gilbert cell multiplier 100, the terminals 58 (see FIG. 2) differentially receive the M1 signal. The terminals 64 differentially receive the I signal. One of the terminals 58 controls a transistor 142 that modulates current (from a current source called $I_{SS}$) through a differential transistor pair 144 that, in turn, is controlled by the I signal. Another one of the terminals 58 controls a transistor 146 that modulates current from the $I_{SS}$ current, which flows through a differential transistor pair 150. The differential transistor pair 150, in turn, is also controlled by the I signal. The output terminals of the differential transistor pairs 144 and 150 are cross coupled together to form output terminals 104 of the Gilbert cell multiplier 100, as can be appreciated by one skilled in the art.

In the Gilbert cell multiplier 120, the terminals 60 (see FIG. 2) differentially receive the M2 signal. The terminals 66 differentially receive the Q signal. One of the terminals 60 controls a transistor 130 that modulates current from the $I_{SS}$ current source through a differential transistor pair 132 that, in turn, is controlled by the Q signal. Another one of the terminals 60 controls a transistor 134 that modulates current from the $I_{SS}$ current source, which flows through a differential transistor pair 136. The transistor pair 136, in turn, is also controlled by the Q signal. The output terminals of the differential transistor pairs 132 and 136 are cross-coupled together to form output terminals 124 of the Gilbert cell multiplier 120, as can be appreciated by one skilled in the art.

The output terminals 104 of the Gilbert cell multiplier 100 are formed from the output terminals of the differential transistor pairs 144 and 150. The output terminals 124 of the Gilbert cell multiplier 120 are formed from the differential transistor pairs 132 and 136. The output terminals 104 of the Gilbert cell multiplier 100 are coupled in parallel with the output terminals 124 of the Gilbert cell multiplier 120 to form the output terminals 68 and 72.

Also depicted in more detail in FIG. 3 is an embodiment of the BPF 70. As shown, the BPF 70 may include an inductor 125 and a capacitor 128 that are coupled in parallel between the output terminals 68 and 72. The inductance and capacitance values for these elements are chosen to tune the passband of the BPF 70 to select the desired harmonic to produce the S2 signal.

Figure 4:
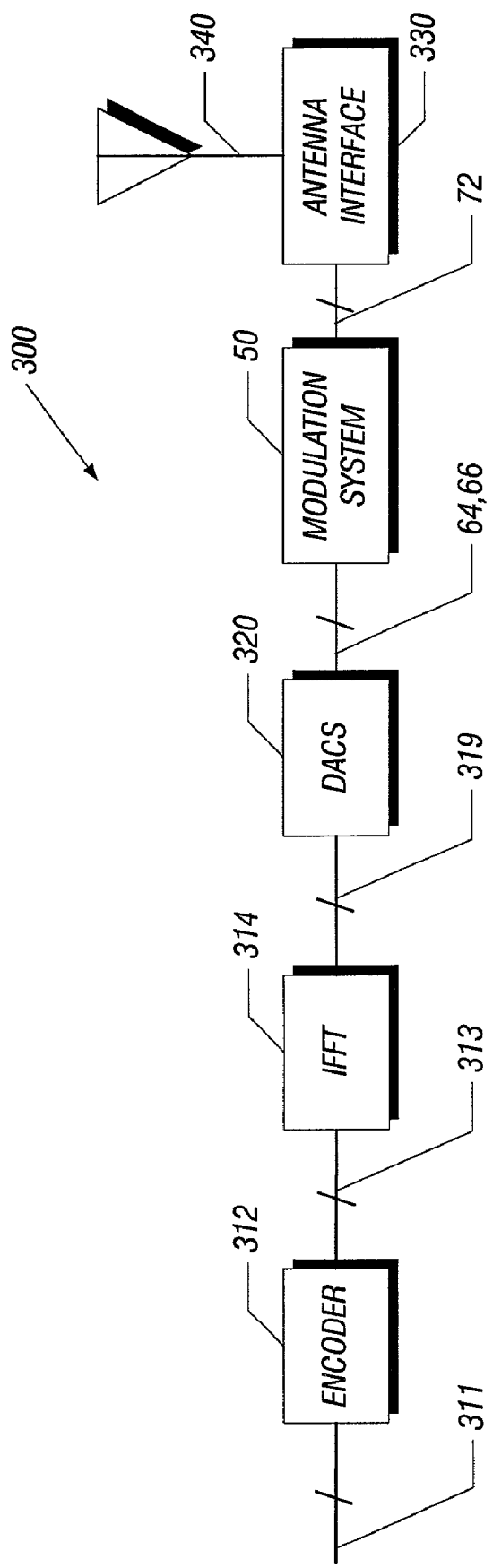
FIG. 4 is a schematic diagram of a transmitter according to an embodiment of the invention.

FIG. 4 depicts an embodiment 300 of a wireless transmitter that uses the modulation system 50. As an example, the transmitter 300 may be an Orthogonal Frequency Division Multiplexing (OFDM) transmitter, although are types of transmitters (wireless and non-wireless) may be used with the modulation system 50 and are within the scope of the appended claims.

During its course of operation, an encoder 312 of the transmitter 300 receives data (via communication lines 311) to be transmitted over a wireless link. The encoder 312 may, for example, introduce an error correcting scheme into the data. The encoder 312 may also perform other operations on the received data, such as a mapping operation, for example. More specifically, the encoder 312 may map the data received by the encoder 312 into a complex value space pursuant to quadrature amplitude modulation (QAM). Other and different operations by the encoder 312 are possible.

The encoder 312 provides the encoded data (via communication lines 313) to an Inverse Fast Fourier Transform (IFFT) engine 314 of the transmitter 300. The encoded data may be viewed as being divided into segments, with each segment representing a coefficient that is associated with one of a subset of OFDM subcarriers that are assigned to the transmitter 300.

The IFFT engine 314 modulates these coefficients with the assigned subcarriers to produce time-varying digital real and imaginary signals. These digital signals, in turn, are communicated (via communication lines 319) to digital-to-analog converters (DACS) 320 that convert these digital signals into the analog I and Q signals that appear on the input terminals 64 and 66 of the modulation system 50. The analog signal that appears at the output terminals 72 of the modulation system 50 is communicated to an antenna interface 330 that drives an antenna 340 with this analog signal.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   receiving a first signal having a fundamental frequency;
   providing a first component of a complex input signal to a first Gilbert cell multiplier;
   providing a second component of the complex input signal to a second Gilbert cell multiplier;
   using the Gilbert cell multipliers to modulate the complex input signal; and
   tuning the modulation to a harmonic of the fundamental frequency to produce a modulated signal having a carrier frequency near the harmonic, the modulated signal having substantially more spectral energy near the harmonic than near the fundamental frequency, wherein the tuning comprises connecting an output terminal of the first Gilbert cell multiplier directly to a bandpass filter and connecting an output terminal of the second Gilbert cell multiplier directly to the bandpass filter.

2. The method of claim 1, wherein the output terminals of the first and second Gilbert cell multipliers comprise output terminals of the bandpass filter.

3. The method of claim 1, wherein the tuning comprises: establishing a filtering passband for the modulation, the passband including frequencies near the harmonic.

4. The method of claim 1, wherein the tuning comprises: filtering out spectral energy of the modulated signal near the fundamental frequency.

5. The method of claim 1, wherein the harmonic comprises an odd harmonic.

6. A system comprising:

an oscillator to generate a first signal having a fundamental frequency; and a modulator comprising:

a first Gilbert cell multiplier to modulate a first component of a complex input signal with the first signal, the first Gilbert cell multiplier comprising an output terminal; and a second Gilbert cell multiplier to modulate a second component of the complex input signal with the first signal, the second Gilbert cell multiplier comprising an output terminal; and a bandpass filter directly connected to the output terminals of the first and second Gilbert cell multipliers to tune the modulation to a harmonic of the fundamental frequency to produce a modulated signal having a carrier frequency near the harmonic, the modulated signal has substantially more spectral energy near the harmonic than near the fundamental frequency.

7. The system of claim 6, wherein the output terminals of the first and second Gilbert cell multipliers comprise output terminals of the bandpass filter.

8. The system of claim 6, wherein the filter establishes a passband for the modulation, the passband including frequencies near the harmonic.

9. The system of claim 6, wherein the filter filters out spectral energy located near the fundamental frequency.

10. The system of claim 6, wherein the harmonic comprises an odd harmonic.

11. A system comprising:

an oscillator to generate a first signal having a fundamental frequency;

a modulator comprising:

a first Gilbert cell multiplier to modulate a first component of a complex input signal with the first signal, the first Gilbert cell multiplier comprising an output terminal; and a second Gilbert cell multiplier to modulate a second component of the complex input signal with the first signal, the second Gilbert cell multiplier comprising an output terminal;

a bandpass filter directly connected to the output terminals of the first and second Gilbert cell multipliers to tune the modulation to a harmonic of the fundamental frequency to produce a modulated signal having a carrier frequency near the harmonic, the modulated signal has substantially more spectral energy near the harmonic than near the fundamental frequency; and a wireless interface to wireless communicate the modulated signal.

12. The system of claim 11, wherein the output terminals of the first and second Gilbert cell multipliers comprise output terminals of the bandpass filter.

13. The system of claim 11, wherein the filter establishes a passband for the modulation, the passband including frequencies near the harmonic.

14. The system of claim 11, wherein the filter filters out spectral energy of the second signal located near the fundamental frequency.

15. The system of claim 11, wherein the harmonic comprises an odd harmonic.

* * * * *